(12) United States Patent
Ohodnicki, Jr. et al.

(10) Patent No.: US 11,408,827 B1
(45) Date of Patent: *Aug. 9, 2022

(54) METHOD OF EVALUATING PH USING A METALLIC NANOPARTICLE INCORPORATED NANOCOMPOSITE-BASED OPTICAL PH SENSOR

(71) Applicant: United States Department of Energy, Washington, DC (US)

(72) Inventors: Paul R. Ohodnicki, Jr., Allison Park, PA (US); Congjun Wang, Bethel Park, PA (US); Thomas D. Brown, Finleyville, PA (US); Barbara Kutchko, Upper St Clair, PA (US)

(73) Assignee: U.S. Department of Energy, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/695,078

(22) Filed: Apr. 24, 2015

Related U.S. Application Data

(60) Provisional application No. 61/987,528, filed on May 2, 2014.

(51) Int. Cl.
*G01N 21/84* (2006.01)
*G01N 21/49* (2006.01)
*G01N 21/31* (2006.01)

(52) U.S. Cl.
CPC ............ *G01N 21/84* (2013.01); *G01N 21/31* (2013.01); *G01N 21/49* (2013.01); *G01N 2201/063* (2013.01); *G01N 2201/0826* (2013.01)

(58) Field of Classification Search
CPC ....... G01N 33/00; G01N 21/00; Y10T 436/00
(Continued)

(56) References Cited

U.S. PATENT DOCUMENTS 5,359,681 A * 10/1994 Jorgenson ............ G01N 21/553
250/227.11
8,411,275 B1 * 4/2013 Ohodnicki, Jr ...... G01N 21/554
356/437

(Continued)

OTHER PUBLICATIONS

Mishra et al., "Surface plasmon resonance based fiver optic pH sensor utilizing Ag/ITO/Al/hydrogel layers," Analyst 9 (2013).

(Continued)

*Primary Examiner* — Isiaka O Akanbi
(74) *Attorney, Agent, or Firm* — Timothy L. Harney; Michael J. Dobbs; Brian J. Lally

(57) ABSTRACT

A method for evaluating the pH of an aqueous solution by utilizing the optical properties of a pH sensing material comprised of plurality of optically active nanoparticles dispersed in matrix material. The optically active nanoparticles have an electronic conductivity greater than about $10^{-1}$ S/cm and generally have an average nanoparticle diameter of less that about 500 nanometers, and the matrix material is a material which experiences a change in surface charge density over a pH range from 2.0 to 12.0 of at least 1%. The method comprises contacting the pH sensing material and the aqueous solution, illuminating the pH sensing material, and monitoring an optical signal generated through comparison of incident light and exiting light to determine the optical transmission, absorption, reflection, and/or scattering of the pH sensitive material. The optical signal of the pH sensitive material varies in response to the pH of the aqueous solution.

14 Claims, 12 Drawing Sheets

(58) Field of Classification Search
USPC .......................................... 356/419, 338, 445
See application file for complete search history.

(56) References Cited

U.S. PATENT DOCUMENTS

| | | | | |
|---|---|---|---|---|
| 8,638,440 | B1* | 1/2014 | Ohodnicki, Jr | G01N 21/783 |
| | | | | 356/437 |
| 2008/0204708 | A1* | 8/2008 | Shaw | G01N 21/552 |
| | | | | 356/36 |
| 2009/0207413 | A1* | 8/2009 | Carpenter | G01N 21/31 |
| | | | | 356/437 |
| 2011/0038784 | A1* | 2/2011 | Plata | B82Y 30/00 |
| | | | | 423/447.1 |

OTHER PUBLICATIONS

Singh et al., "Fabrication and characterization of a highly sensitive surface plasmon resonance based fiber optic pH sensor utilizing high index layer and smart hydrogel," Sensors and Actuators B 173 (2012).

Aslan et al, "Enhanced Ratiometric pH Sensing Using SNAFL-2 on Silver Island Films: Metal-enhanced Fluorescence Sensing," Journal of Fluorescence 15(1) (2005).

Toh et al, "Induced pH-dependent shift by local surface plasmon resonance in functionalized gold nanorods," Nanoscale Research Letters 8 (2013).

Rayss et al., "Ion adsorpotion in the porous sol-gel silica layer in the fibre optic pH sensor," Sensors and Actuators B 87 (2002).

\* cited by examiner

METHOD OF EVALUATING PH USING A METALLIC NANOPARTICLE INCORPORATED NANOCOMPOSITE-BASED OPTICAL PH SENSOR

RELATION TO OTHER APPLICATIONS

This patent application claims priority from provisional application 61/987,528 filed May 2, 2014, which is hereby incorporated by reference.

GOVERNMENT INTERESTS

The United States Government has rights in this invention pursuant to the employer-employee relationship of the Government to the inventors as U.S. Department of Energy employees and site-support contractors at the National Energy Technology Laboratory.

FIELD OF THE INVENTION

One or more embodiments relates to a method for sensing the pH of an aqueous solution through evaluation of the optical signal of a pH sensing material comprised of optically active nanoparticles dispersed in a matrix material.

BACKGROUND

Monitoring of chemical composition in harsh environments including downhole and underwater conditions is critically important for a range of fossil energy related applications, which include unconventional, deep and ultra-deep oil and gas resource recovery through drilling and hydraulic fracturing techniques, as well as environmental monitoring in reservoirs for $CO_2$ sequestration. These conditions represent extremely challenging environments for the development and deployment of sensing technologies due to an aggressive combination of temperature and pressure, as well as the presence of chemically corrosive chemical species and a potentially high salinity. Temperatures ranging up to 300° C. and pressures ranging up to 30,000 psi can be relevant for these applications depending on the specific environment. Such temperatures and pressures are beyond the limit of most electrical and electronic components used in sensor applications, due in many cases to the instabilities associated with packaging, wires, and interconnects. For this reason, approaches that eliminate the need for electrical components and connections at the sensing location can also eliminate a common mode of failure for conventional sensor devices.

Optical based sensing methodologies offer this advantage and can also be advantageous from a safety perspective in the presence of potentially flammable gas and chemical species. In particular, sensors that employ fiber-bragg gratings inscribed into specialty optical fibers capable of withstanding the temperature and pressure conditions of interest have already been deployed commercially for distributed pressure and temperature sensing. In contrast, optical fiber based sensors for subsurface chemical sensing applications have not been commercially deployed due in part to the lack of optical sensor elements with useful, reversible, and rapid responses to particular chemical species of interest.

While a broad range of parameters related to the chemistry of harsh conditions such as downhole conditions can be potentially monitored, pH is a key parameter whose accurate measurement at downhole wellbore conditions is critical in understanding formation fluid water chemistry to predict corrosion and scale potential. Because gases and solids can come out of solution as downhole samples are transported to surface laboratories, it is important to develop technologies for accurate pH measurements downhole in the native condition at reservoir temperatures and pressures. The lack of a robust measurement requires large safety margins in the selection of corrosion resistant materials and a significant economic impact can therefore be realized by the development of such a technology. In addition, measured pH values can be utilized to infer additional information about the chemical composition of a fluid such as the concentration of $CO_2$ in fluids contained within geological formations for $CO_2$ sequestration.

A broad range of technologies exist for pH sensing in aqueous conditions including pH sensitive dyes, electrochemical and potentiometric based approaches, and electronically conductive polyaniline-based polymers. Additionally, plasmonic sensors have been demonstrated in which noble metals are functionalized with capping agents or an organic matrix that mediates a response to pH through relatively large changes in swelling of the polymer, modification of refractive index or through protonation/deprotonation reactions, or aggregation and de-aggregation of particles in solution. See e.g. Mishra et al., "Surface plasmon resonance based fiber optic pH sensor utilizing Ag/ITO/Al/hydrogel layers," *Analyst* 9 (2013); see also Singh et al., "Fabrication and characterization of a highly sensitive surface plasmon resonance based fiber optic pH sensor utilizing high index layer and smart hydrogel," *Sensors and Actuators B* 173 (2012); see also Aslan et al, "Enhanced Ratiometric pH Sensing Using SNAFL-2 on Silver Island Films: Metal-enhanced Fluorescence Sensing," *Journal of Fluorescence* 15(1) (2005); see also Toh et al, "Induced pH-dependent shift by local surface plasmon resonance in functionalized gold nanorods," *Nanoscale Research Letters* 8 (2013). Optical sensors based on protonation of silica-based sol-gel materials have also been reported. See Rayss et al., "Ion adsorption in the porous sol-gel silica layer in the fibre optic pH sensor," *Sensors and Actuators B* 87 (2002); and see Rayss et al., "Optical Aspects of Na+ Ions Adsorption on Sol-Gel Porous Films Used in Optical Fiber Sensors," *Journal of Colloid and Interface Science* 250 (2002). However, these silica gel materials required coating on a highly bent optical fiber to be effective which is undesirable for pH sensing applications due to limitations in sensor design including distributed interrogation. Similarly, the silica gels were utilized for pH sensing without a high temperature pretreatment significantly above the subsequent temperature at which sensing experiments are performed, which thereby would limit the stability of the silica gel sensing material to near-ambient temperature applications to avoid modifications to the silica based layer during the sensing experiment.

It would be advantageous if a measurement methodology allowed for mapping of information about pH in real-time spatially within harsh conditions such as wellbores and throughout geological formations. It would also be advantageous if the sensing approach was optical-based in nature with a sensing response that was not dependent upon protonation and deprotonation of an organic indicator dye, due to inherent limitations in both temperature stability and resistance to leaching. Higher stability matrices and substrates are desired for long-term operation in aggressive downhole environments. As such, it would be preferred for a stable matrix material to be functionalized with a stable optical sensing element that exhibits chemical and temperature stability but demonstrates a reversible response to changing pH conditions. It would also be preferred if the sensing layer was subjected to an elevated temperature pre-treatment significantly above the temperature at which pH monitoring would be performed to ensure adequate sensing response stability. It would be further advantageous if the response did not require a bent optical fiber sensing element to be measurable due to constraints on the ability to deploy such elements for distributed sensing applications.

Provided here is a method of pH sensing which addresses these weaknesses by exploiting the optical property changes of thin films that are stable under harsh conditions. The method exhibits a strong overall optical response associated with reversible interactions between the pH sensing material and the solution for which pH is being monitored. A key distinguishing feature of the invention described here involves the application of stable matrix or underlayer materials that generally do not exhibit a measurable optical response to changing pH in the absence of incorporated nanoparticles. Exploitation of inorganic nanoparticles as the absorption-based indicator elements to replace organic dyes potentially allows for a broader application space, improved temperature stability, and the possibility of multi-parameter monitoring through broadband wavelength interrogation by monitoring changes in optical properties in response to other important parameters such as temperature.

These and other objects, aspects, and advantages of the present disclosure will become better understood with reference to the accompanying description and claims.

SUMMARY

The disclosure provides a method for evaluating the pH of an aqueous solution by utilizing the optical properties of a particular pH sensing material. The pH sensing material is comprised of a plurality of optically active nanoparticles dispersed in a matrix material. The optically active nanoparticles have an electronic conductivity greater than about $10^{-1}$ S/cm, and generally have an average nanoparticle diameter of less than about 500 nanometers, and the matrix material is a material which experiences a change in surface charge density over a pH range from 2.0 to 12.0 of at least 1% of the maximum value obtainable in absolute terms.

The method generally comprises contacting the pH sensing material and the aqueous solution, illuminating the pH sensing material, and monitoring an optical signal. The optical signal is generated by illuminating the pH sensitive material with incident light from a light source and collecting the exiting light, and comparing the incident light and the exiting light in order to determine the optical transmission, absorption, reflection, and/or scattering of the pH sensitive material. The optical signal of the pH sensitive material varies in response to the pH of the aqueous solution, providing a means by which the pH and any changes in the pH may be analyzed. In a particular embodiment, the pH sensing material is illuminated by a wave propagating along a waveguide, such as a fiber optic cable.

In an embodiment, the optically active nanoparticles comprise a metal or metal oxide. In a further embodiment, the optically active nanoparticles are comprised of metals well-known to display a plasmon resonance such as Au, Ag, Al, and Cu or alloys or compounds thereof. In another embodiment, the optically active nanoparticles are comprised of metals commonly referred to as noble or precious metals which tend to exhibit improved resistance to corrosion, reduced reactivity, and relatively high melting points such as gold, palladium, silver, platinum, ruthenium, rhodium, osmium, or iridium, or alloys or compounds thereof. In another embodiment the optically active nanoparticles are comprised of a conducting metal oxide. In a further embodiment, the matrix material is a material having a volumetric change over a pH range from 2.0 to 12.0 of less than or equal to 0.1%, and in an additional embodiment, the matrix material comprises a silicon compound, such as such as silica or silane. The matrix material is permeable at least to some degree to the incident light at wavelengths corresponding to the optical signal. The strong optical response of the pH sensing material disclosed is generally associated with the optically active materials embedded in the matrix material.

The novel process and principles of operation are further discussed in the following description.

DETAILED DESCRIPTION

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide a method of evaluating the pH of an aqueous solution based on changes to the optical properties of a pH sensing material comprised of optically active nanoparticles dispersed in a matrix material.

The disclosure provides a method for evaluating the pH of an aqueous solution by utilizing the optical properties of a particular pH sensing material. The pH sensing material is comprised of a plurality of optically active nanoparticles dispersed in a matrix material. The optically active nanoparticles have an electronic conductivity greater than about $10^{-1}$ S/cm, and generally have an average nanoparticle diameter of less than about 500 nanometers. The matrix material is a material which experiences a change in surface charge density over a pH range from 2.0 to 12.0 of at least 1%. The method generally comprises contacting the pH sensing material and the aqueous solution, illuminating the pH sensing material, and monitoring an optical signal. The optical signal is generated by illuminating the pH sensitive material with incident light from a light source and collecting the exiting light, and comparing the incident light and the exiting light in order to determine the optical transmission, absorption, reflection, and/or scattering of the pH sensitive material. The optical signal of the pH sensitive material varies in response to the pH of the aqueous solution, providing a means by which the pH and any changes in the pH may be analyzed.

Figure 1:
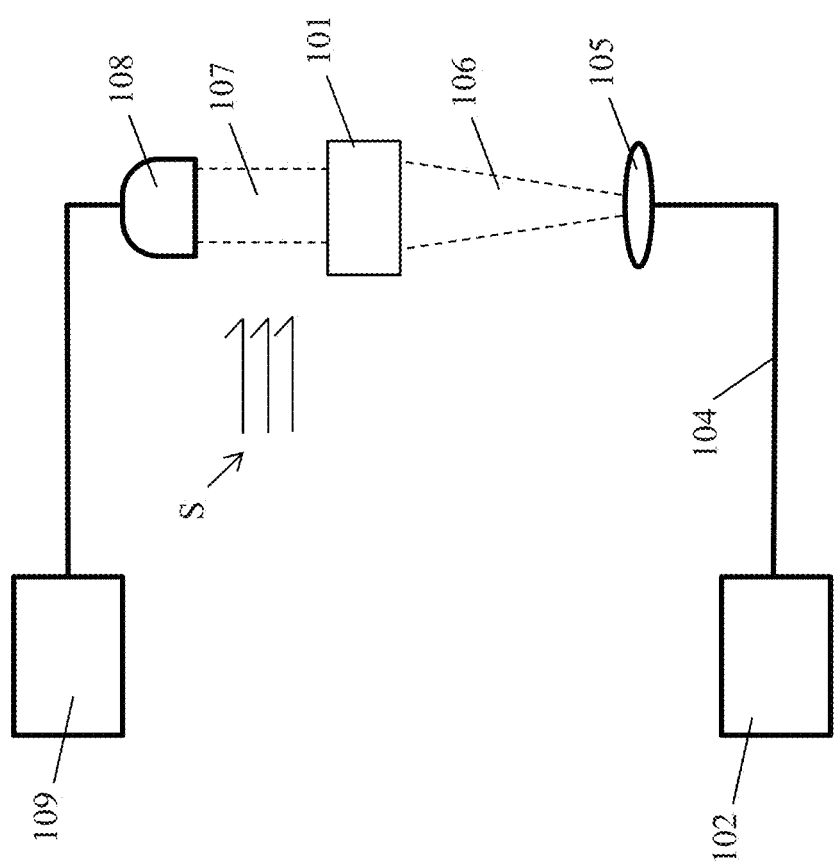
FIG. 1 illustrates an embodiment of the methodology.

The basic principles of the method are illustrated at FIG. 1. At FIG. 1, light from light source 102 is directed along an optical fiber 104 and focused by lens 105 producing incident light 106 illuminating pH sensing material 101. Concurrently, exiting light 107 is collected behind the specimen using a probe 108 connected to a spectrophotometer 109. Data generated by spectrophotometer 109 or supporting equipment is processed, and an optical signal is displayed. The optical signal is a comparison of the incident light and the exiting light and indicates the absorption, transmission, reflection, and scattering of the incident light at certain wavelengths by pH sensing material 101. The optical signal indicates selective photon absorption or scattering of light at certain wavelengths by pH sensing material 101. The pH sensing material 101 is additionally in contact with an aqueous solution S. Incident light 106, exiting light 107, and pH sensing material 101 generate an optical signal which depends on the pH of the aqueous solution S, and the optical signal at monitored wavelengths is indicative of the pH and any changes in the pH.

Figure 2:
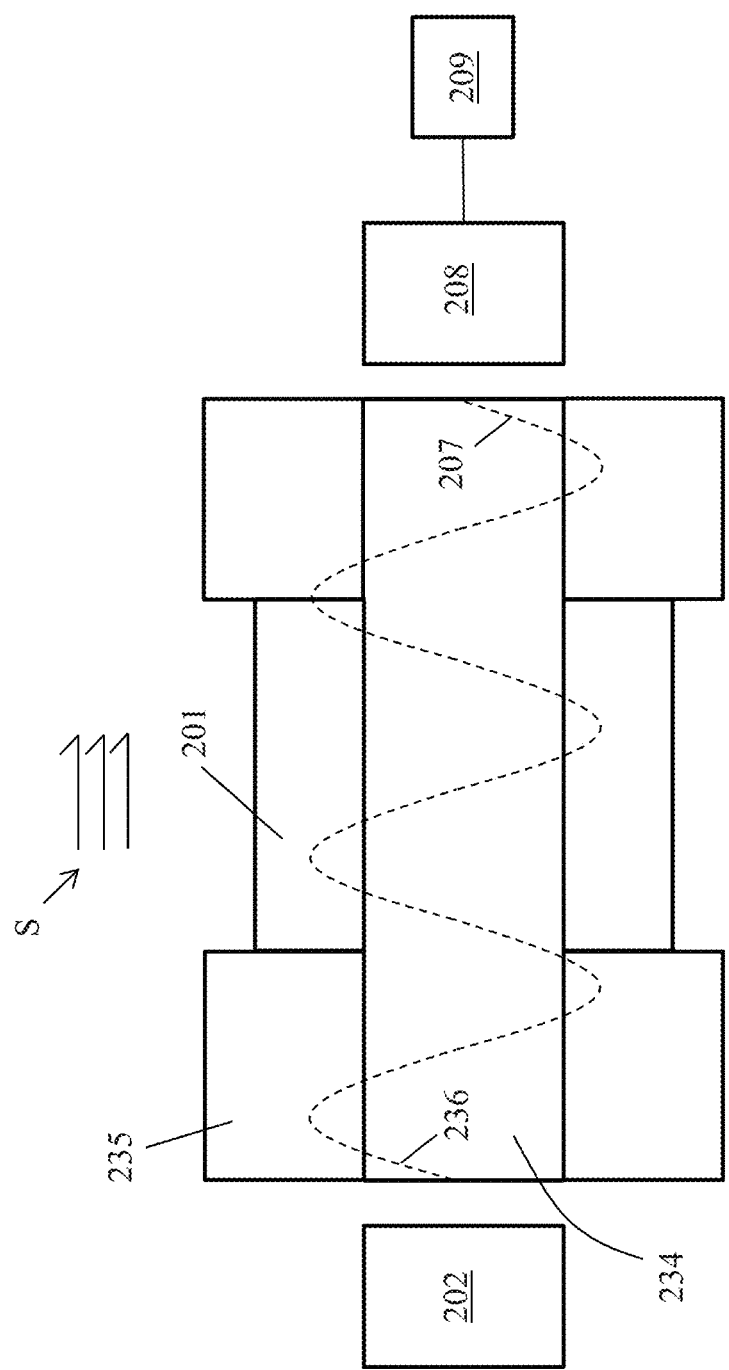
FIG. 2 illustrates another embodiment of the methodology.

An additional embodiment is depicted at FIG. 2, where the pH sensing material 201 is illuminated by a wave propagating along a waveguide, such as a fiber optic cable. The waveguide is comprised of a core material 234 in contact with a cladding material 235, where core material 234 has a refractive index greater than cladding material 235. For example, core material 234 and cladding material 235 may be comprised of silica and various additions such as germanium, titanium, phosphorous, boron, fluorine, or other dopants in order to alter the respective refractive indices and meet the necessary criteria. At FIG. 2 light source 202 emits light into core material 234, generating wave 236 penetrating cladding material 235. Additionally at FIG. 2, pH sensing material 201 having the properties disclosed is placed in contact with core material 234 such that pH sensing material 201 is illuminated by wave 236 as incident light, as illustrated. Exiting light 207 is collected by probe 208, connected to spectrophotometer 209. Illumination of pH sensing material 201 by wave 236 enables evaluating the pH of aqueous solution S in contact with pH sensing material 201 by monitoring a shift in the optical signal, as earlier described. The optical power and penetration depth of wave 236 into cladding 235 and pH sensing material 201 can be described by Beer-Lambert law in many cases. See e.g., Dickinson et al., "Convergent, Self-Encoded Bead Sensor Arrays in the design of an Artificial Nose," *Anal. Chem.* 71 (1999), among others. As is similarly understood, the optical power coupled into the evanescent field may be improved by various methods such as bending, optimizing the relative refractive indices of the core and cladding, use of hollow fibers, and other methods. See e.g., Elosua et al., "Volatile Organic Compound Optical Fiber Sensors: A Review," *Sensors* 6 (2006), among others. However, responses that are substantially absent without fiber bending are typically less preferred due to limitations imposed upon optical fiber sensor design and deployment including an ability to perform distributed interrogation.

Figure 3:
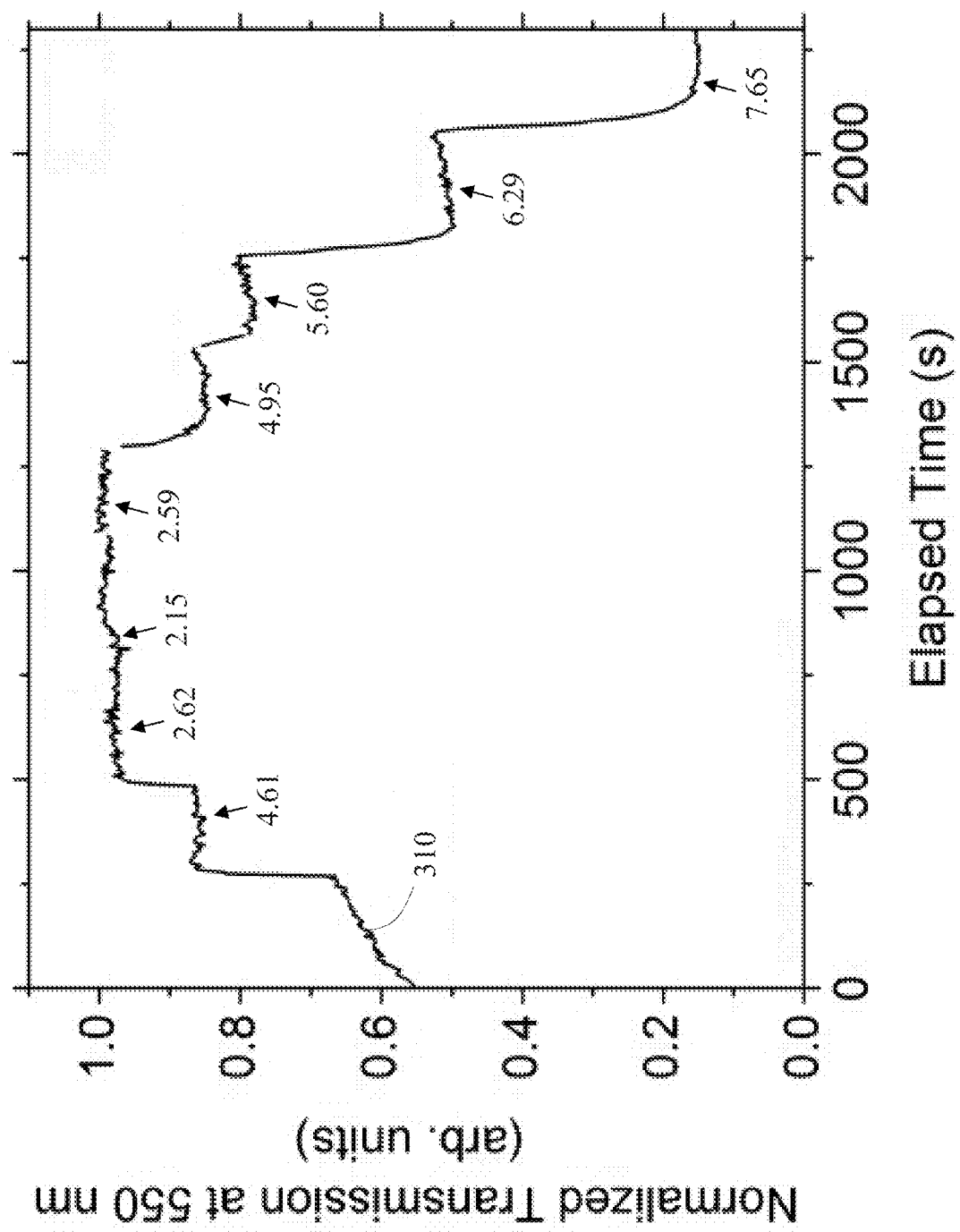
FIG. 3 illustrates the optical signal of an embodiment comprising Au/silica at a wavelength of 550 nm.
Figure 4:
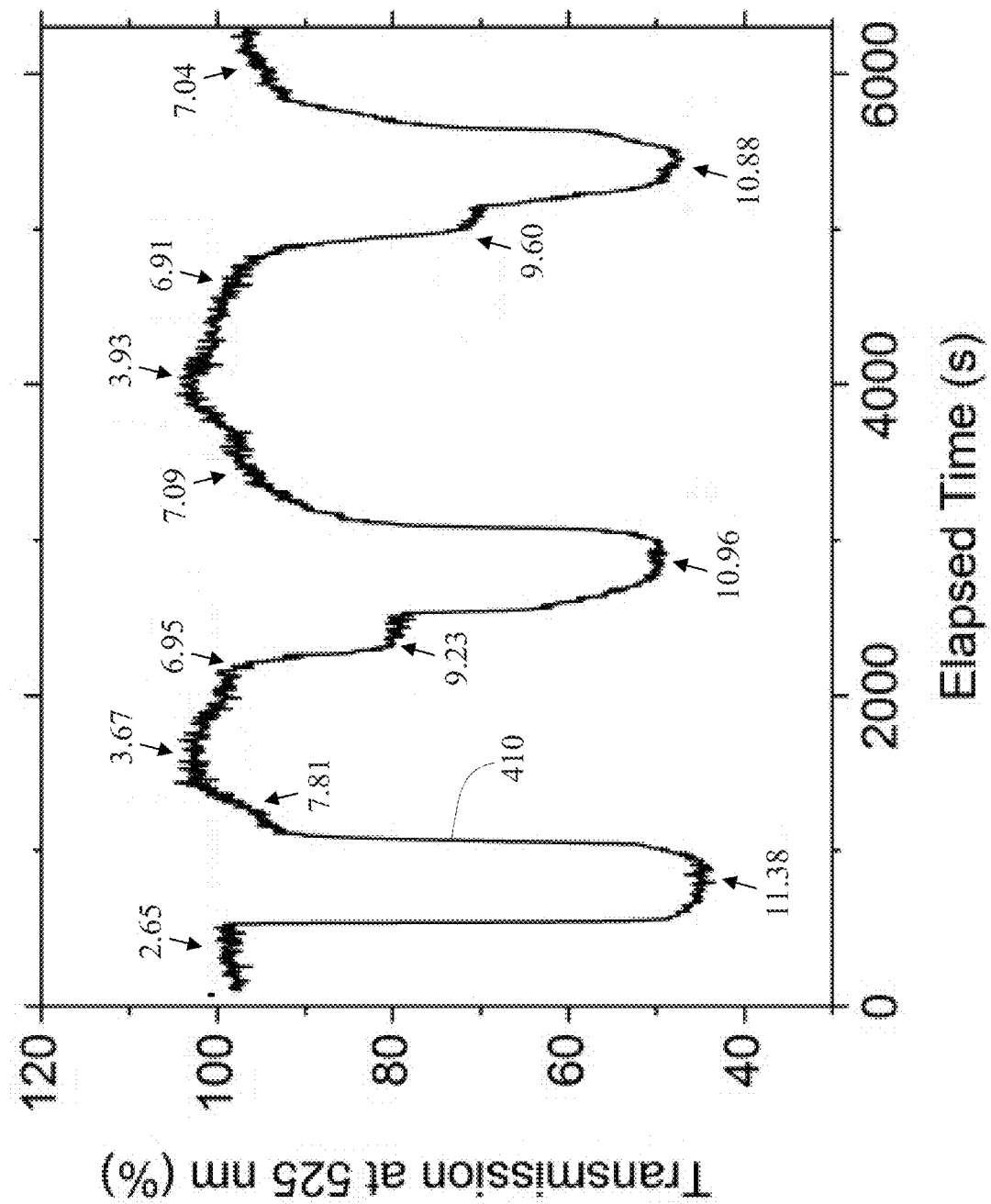
FIG. 4 illustrates the optical signal of an embodiment comprising Au/silica at a wavelength of 525 nm.
Figure 5:
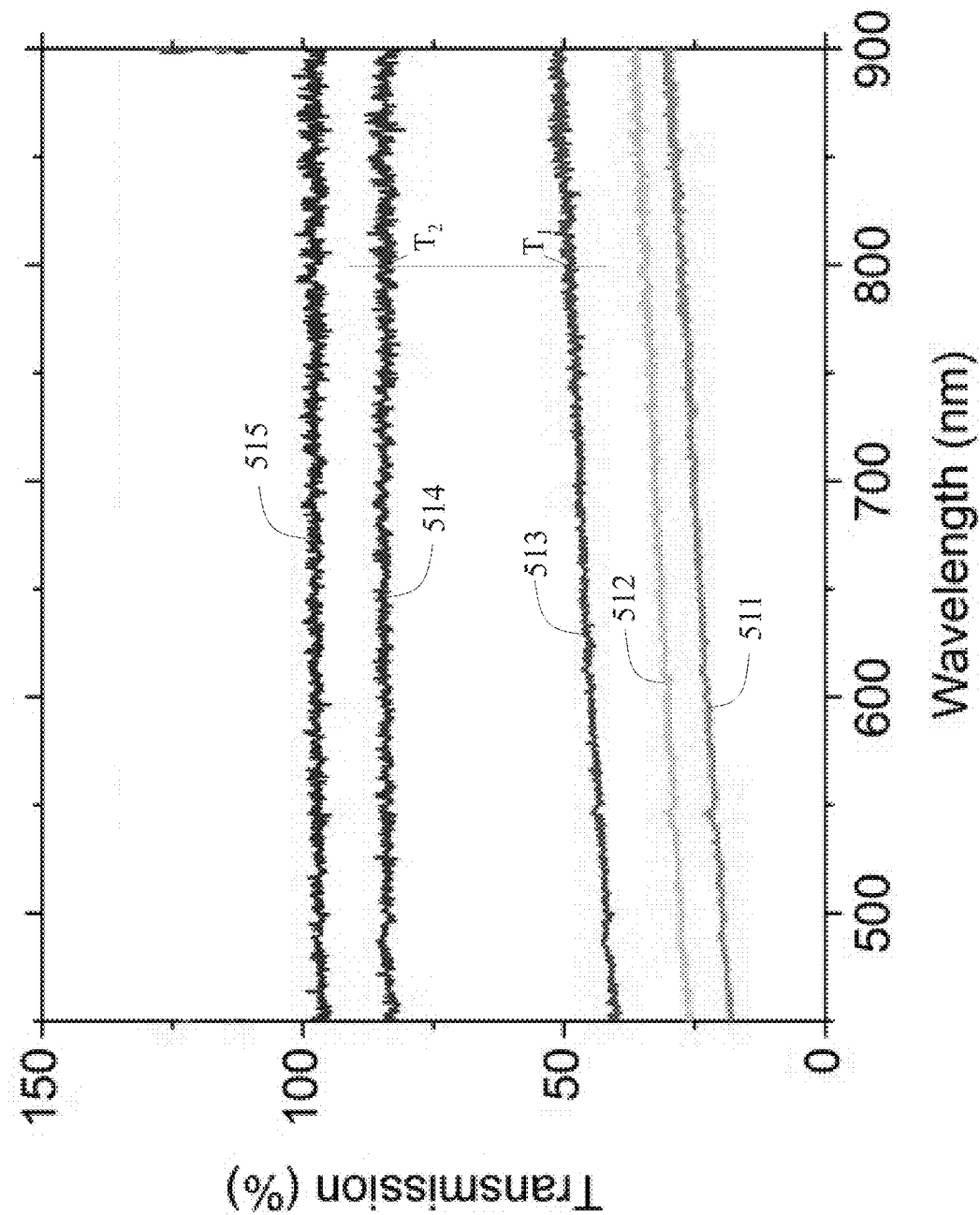
FIG. 5 illustrates optical signals for an embodiment comprising Pd/silica over a wavelength range 450-900 nm.
Figure 6:
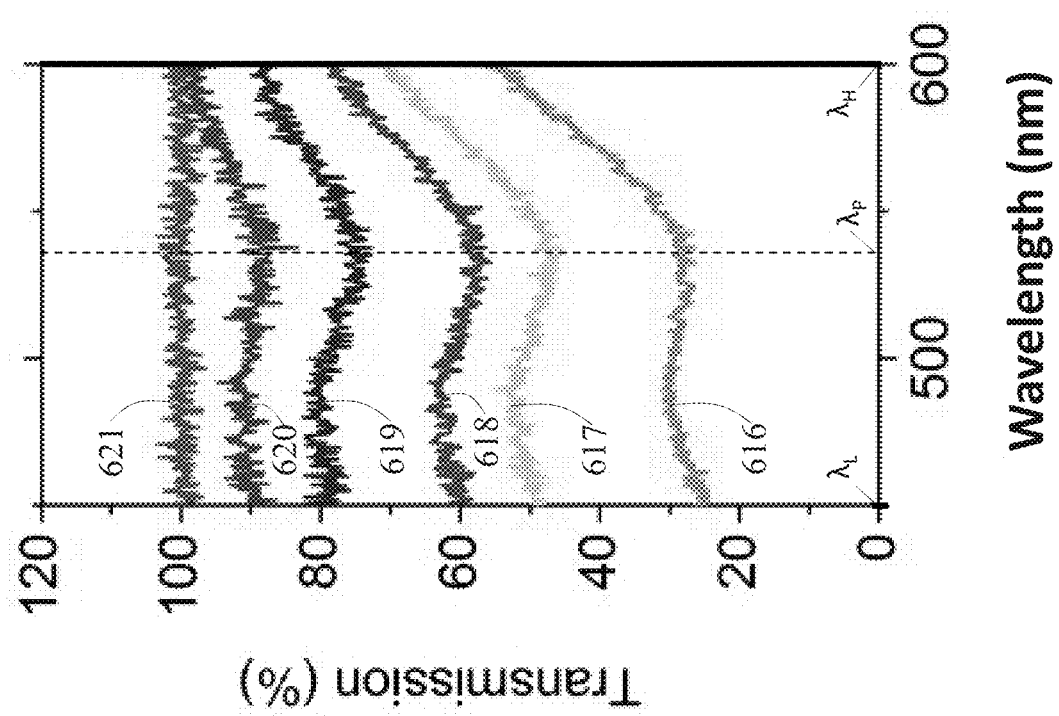
FIG. 6 illustrates optical signals for an embodiment comprising Au/silica over a wavelength range 450-600 nm.

As an example, FIG. 3 illustrates the results of the method using an apparatus similar to that depicted at FIG. 2, where the pH sensing material comprises optically active nanoparticles of Au and a matrix material comprising silica. The pH sensing material was placed in contact with an aqueous solution comprising saturated NaCl solution (23.95%) at about 80° C. FIG. 3 illustrates the optical signal 310 as transmission at a wavelength of 550 nm as a function of experiment time. At FIG. 3, results according to aqueous solution pH are generally indicated by the pH values present at the experiment time, as indicated by the pH values 4.61, 2.62, 2.25, 2.59, 4.95, 5.60, 6.29, and 7.65 at FIG. 3. FIG. 4 illustrates results for a similar Au/silica coated optical fiber, illustrating optical signal 410 as transmission at a wavelength of 525 nm as a function of experiment time, with results indicated by the pH values present and generally indicated by the pH values 2.65, 11.38, 7.81, 3.67, 6.95, 9.23, 10.96, 7.09, 3.93, 6.91, 9.60, 10.88, and 7.04. As a further example, FIG. 5 illustrates the results of a pH sensing material comprising optically active nanoparticles of Pd and a matrix material comprising silica, with optical signals generated over a wavelength of from about 450 nm to about 900 nm. At FIG. 5, optical signals 511, 512, 513, 514, and 515 correspond to pH values of 11.83, 11.23, 10.88, 9.51, and 9.00 respectively. FIG. 6 demonstrates additional examples for a Au/silica coated optical fiber over a wavelength of from about 450 nm to about 600 nm, where optical signals 616, 617, 618, 619, 620, and 621 correspond to pH values of 11.18, 10.03, 9.45, 8.35, 6.70, and 4.09 respectively. As illustrated, monitoring the optical signal generated by the pH sensing material provides a means by which the pH of an aqueous solution may be evaluated.

Within this disclosure, "optical signal" means a comparison of light incident on the pH sensing material and light exiting the pH sensing material at one or more wavelengths using optical spectroscopy. Correspondingly, the optical signal may reflect one specific wavelength, or may reflect a monitored band of wavelengths. The optical signal may be expressed as, for example, a transmittance at the one or more wavelengths, an absorption at the one or more wavelengths, or any other parameters which indicate the absorption, transmission, reflection, scattering or other optical impacts on the incident light as a result of interaction with the pH sensing material. As is understood, optical spectroscopy based on a comparison of the incident light and the exiting light may indicate the absorption, transmission, reflection, scattering, and optical impacts which occur as a result of interaction between the incident light and the pH sensing material. See e.g., Ingle, James D., and Stanley R. Crouch, *Spectrochemical analysis*, Englewood Cliffs, N.J.: Prentice Hall, 1988; see also Sole, Jose, *An Introduction to the Optical Spectroscopy of Inorganic Solids* (2005); see also Sarid, Dror and Challener, William, *Modern Introduction to Surface Plasmons: Theory, Mathematica Modeling, and Applications* (2010), among others. Additionally, the optical signal as disclosed here is generally not constrained to a specific wavelength or band of wavelengths. For example, the optical signal may occur at one or more wavelengths typically considered to be ultraviolet, visible, or near-infrared as those terms are used in the art, as well as wavelengths falling outside those delineated ranges.

The pH sensitive material utilized is comprised of a plurality of optically active nanoparticles dispersed in the matrix material. The optically active nanoparticles generally have an electronic conductivity greater than about $10^{-1}$ S/cm, and generally have an average nanoparticle diameter of less than about 500 nanometers. Such highly electronically conductive particles may be preferred because they often tend to exhibit a relatively large optical absorption in nanoparticulate form. The average nanoparticle diameter may be determined using various methods known in the art for the sizing of nanoparticles, for example, scanning electron microscopy (SEM), atomic force microscopy (AFM), and transmission electron microscopy (TEM) methods. Preferably, the average particle size is determined through image analysis by capturing a sample of typically at least 100 nanoparticles, more preferably at least 300 nanoparticles. In an embodiment, the optically active nanoparticles comprise a metal or metal oxide. Here, "metal" means any element represented on the Periodic Table of Elements with the exception of H, C, N, P, O, S, Se, and elements within groups 17 and 18, and "metal oxide" means a compound having the empirical formula $M_aO_b$ where M is at least a first metal and O is an oxygen anion. In an embodiment, the optically active nanoparticles are comprised of metals well-known to display a plasmon resonance such as Au, Ag, Al, and Cu or alloys or compounds thereof. In another embodiment, the optically active nanoparticles are comprised of metals commonly referred to as noble or precious metals which tend to exhibit improved resistance to corrosion, reduced reactivity, and relatively high melting points such as gold, palladium, silver, platinum, ruthenium, rhodium, osmium, or iridium, or alloys or compounds thereof. In another embodiment the optically active nanoparticles are comprised of a conducting metal oxide, where the conducting metal oxide has a carrier concentration of at least $10^{17}/cm^3$, a bandgap of at least 2 eV, and an electronic conductivity of at least $10^{-1}$ S/cm. In an additional embodiment, the conducting metal oxide has the empirical formula $A_yB_xO_z$, where A is the first element, B is the second element, and O is an oxygen anion. In a further embodiment, the conducting metal oxide has the empirical formula $A_{(1-x)}B_xO_z$. Exemplary conducting metal oxides include but are not limited to AZO ($Zn_{1-x}Al_xO$), ITO ($In_{2-x}Sn_xO_3$), Nb-doped $TiO_2$ ($Ti_{1-x}Nb_xO_2$), and F-doped $SnO_2$.

Generally, the optically active nanoparticles generally display some degree of light absorption and/or scattering. In a particular embodiment, an individual optically active nanoparticle in the plurality of optically active nanoparticles has an extinction cross-section of at least $10^{-16}$ $cm^2$ over a subset of the wavelength range of from about 200 nanometers to about 3500 nanometers. In a particular embodiment, the subset of the wavelength range encompasses a continuous span of at least 10 wavelengths, and in another embodiment, the subset includes a wavelength within the one or more wavelengths of the optical signal. In an additional embodiment, the optically active nanoparticles have an extinction cross-section of at least $10^{-16}$ $cm^2$ for at least one of the wavelengths represented within the optical signal. In another embodiment, the optically active nanoparticles display a localized surface plasmon resonance, as determined through methods known in the art. See e.g., Willets et al., "Localized Surface Plasmon Resonance Spectroscopy and Sensing," *Annu. Rev. Phys. Chem.* 58 (2007), among others. Further, the optically active nanoparticles are not limited to strictly spherical shapes, and may be comprised of shapes such as triangular prisms, disks, shells, wires, rods, and others. When such structures are present, the average particle diameter refers and is equivalent to an equivalent circular diameter (ECD), which connotes the diameter of a circle with area equal to that of the projection of the particle on a plane. See e.g., Xu et al, "Comparison of sizing small particles using different technologies," *Powder Technology* 132 (2003).

Generally speaking, organic dye based optical pH indicators are well known in the art. Such indicator dyes have been embedded within a sol-gel based matrix such as silica for pH sensing, but the mechanism is typically thought to result from direct protonation or deprotonation reactions with indicator molecules in response to changes in solution phase pH. For pH indicator dyes, a well-defined pKa value is commonly defined in the art as the pH at which the reaction substantially occurs, and the reaction is well-known to occur with an associated change in optical signal when the indicator is dispersed within a solution. In a particular embodiment, the optically active nanoparticles are substantially absent of any such common pH indicator dyes and they do not exhibit a characteristic pKa value when dispersed directly in solution. If the particles are known to have a well-defined pKa, the reaction associated with the pKa that occurs in a plurality of optically active nanoparticles when dispersed in solution results in a relative change of less than about 5%, more preferably less than 1%, and most preferably less than 0.1% between a first signal $S_1$ in a solution with a certain $pH_1$ and a second signal $S_2$ in a solution with a certain $pH_2$, where the first signal $S_1$ and the second signal $S_2$ are both an optical parameter at a given wavelength, and the optical parameter is an absorption, a transmission, a reflection, a scattering, or combinations thereof. Here, the first signal $S_1$ results when the plurality of nanoparticles are in contact with a given aqueous solution with a $pH_1$, and the second signal $S_2$ results when the plurality of nanoparticles are in contact with the given aqueous solution with a $pH_2$, and the relative change is such that an absolute value of $(S_1-S_2)/S_n$ multiplied by 100 is less than or equal to 5, where $S_n$ is the greater of either $S_1$ or $S_2$. In another particular embodiment, the $pH_1$ of the given aqueous solution is at least 3 pH units below the pKa of the nanoparticles at 25° C. and the $pH_2$ of the given aqueous solution is at least 3 pH units above the pKa of the nanoparticles at 25° C. In another embodiment, the given wavelength is one of the one or more wavelengths of the optical signal, and in a further embodiment the optical parameter is an absorption. It should be noted that in some cases, optically active particles may be observed to undergo reversible or irreversible clustering effects when dispersed directly in a solution phase due to the presence of interparticle interactions which may result in a measurable optical signal. However, such a mechanism is not preferred as it requires dispersal of the optically active nanoparticles directly into the solution phase to be monitored as well as the ability to interrogate dispersed particles within a solution phase. This mechanism is not substantially active in the embodiments described here as the particles are effectively immobilized through their dispersal within the matrix layer.

In another embodiment, the optically active nanoparticles are a plurality of nanoparticles which generate an enhancement of at least 50% between a first optical signal $O_1$ generated by a pH sensing material and a second optical signal $O_2$ generated by a matrix material alone. Here, the first optical signal $O_1$ is an optical signal observed at a given pH of an given aqueous solution using a first pH sensing material comprising the plurality of nanoparticles and a specific matrix material, and the second optical signal $O_2$ is an optical signal observed at the given pH of the given aqueous solution using a second pH material consisting of the specific matrix material alone, and the enhancement is such that an absolute value of $(O_1-O_2)/O_2$ multiplied by 100 is greater than or equal to 50.

As discussed, the optically active nanoparticles have an electronic conductivity greater than about $10^{-1}$ S/cm. Electronic conductivity may be determined using any means known in the art. See. e.g., R. Bartnikas, *Electrical Properties of Solid Insulating Materials: Measurement Techniques*, Engineering Dielectrics Volume IIB (1987), among others. Direct measurements of electrical conductivity of the optically active nanoparticles in a pH sensing material can be complicated due to a lack of electrical continuity between dispersed nanoparticles. One method for determining the electrical conductivity of the optically active nanoparticles involves determining the electrical conductivity of a continuous film of substantially the same nominal composition and density as the optically active nanoparticles using any means known in the art. As one example, the electrical conductivity of Au nanoparticles to be utilized in, for example, a Au/silica pH sensing material may be determined by depositing a Au film of approximately 100 nm in thickness through standard sputter deposition techniques onto a glass substrate. The electrical conductivity of the Au optically active nanoparticles of the pH sensing material can then be used as a proxy for the approximate conductivity of Au nanoparticles through standard techniques known in the art. An alternate method for determining electrical conductivity might be through optical spectroscopy or AC conductivity measurements in conjunction with commonly known approaches for obtaining DC conductivity from AC conductivities. Such techniques can also be used for determining AC conductivity for composite materials and for the constituent phases through application of optical modeling techniques known in the art. For example, optical spectroscopy could be employed to determine the optical constants of a Au/silica pH sensing material which can then be modeled using effective medium approximations in conjunction with standard optical models to determine the electrical conductivity of the Au optically active nanoparticles. See e.g. C. Tsonos, "AC and DC conductivity correlation: the coefficient of Barton-Nakajima-Namikawa relation", *Journal of Non-Crystalline Solids* 358 (2012); see also J. Lloyd-Hughes, "A review of the terahertz conductivity of bulk and nano-materials", *Journal of Infrared, Millimetre and Terahertz Waves* 33 (9) (2012); see also H. Su, "Optical and electrical properties of Au nanoparticles in two-dimensional networks: an effective cluster model", *Optics Express* 17 (2009). It is understood that the above methods of determining electronic conductivity are intended to be exemplary only, and are not intended as limitations within this disclosure. Any methods known in the art for determining the electronic conductivity of the materials as described herein may be utilized.

In some embodiments, plurality of optically active nanoparticles has an average nanoparticle diameter of less than about 100 nanometers. The average size of the optically active nanoparticles may be tailored in order to derive a desired response. For example, relatively large particles approaching 100 nm in diameter are expected to strongly scatter light in the visible range while relatively small particles less than approximately 10-20 nm are not. Tailoring the particle size can therefore affect the wavelength and optical response of a metallic nanoparticle extinction, absorption, and scattering cross-section. Tailoring of particle size may also be important for optimizing additional aspects such as the stability of the pH sensing material as well as the type, degree, and kinetics of a pH sensing response. In an embodiment, the average nanoparticle diameter is greater than about 2 nm.

The matrix material is a material which displays a change in surface charge density over a pH range from 2.0 to 12.0 of at least 1%, when the matrix material is in contact with an aqueous solution. Methods for determination of surface charge density are known in the art. See e.g. Wang et al., "Novel Silica Surface Charge Density Mediated Control of the Optical Properties of Embedded Optically Active Materials and Its Application for Fiber Optic pH Sensing at Elevated Temperatures," *Nanoscale* (2015), DOI: 10.1039/C4NR06232A, and associated references. In a particular embodiment, the matrix material is a material having a volumetric change over a pH range from 2.0 to 12.0 of less than or equal to 0.1%. A negligible swelling and contraction of the matrix material is typically a signature of a material that is expected to exhibit an enhanced stability due to reduced degree of volumetric interactions between the solution phase under interrogation and the matrix material. Similarly, a material with reduced volumetric expansion is anticipated to have a lower cross-sensitivity to swelling and contraction in response to other environmental parameters such as solution phase temperature. In another embodiment, the matrix material comprises an inorganic metal oxide of the formula $M_aO_b$, where M comprises one or more metals. In yet another embodiment, the matrix material comprises an inorganic metal oxide of the formula $M_aO_b$ while the optically active nanoparticles are comprised of a metal or metal alloy comprising Ag, Au, Al, Cu, Pd, Pt, Rh, Ir, Os, or combinations thereof. In yet another embodiment, the matrix material comprises an inorganic metal oxide of the formula $M_aO_b$ while the optically active nanoparticles are comprised of a metal or metal alloy known to exhibit a localized surface plasmon resonance in the visible or near-IR range comprising (Ag, Au). In yet another embodiment, the matrix material comprises an inorganic metal oxide of the formula $M_aO_b$ while the optically active nanoparticles are comprised of a metal or metal alloy well known to lack a localized surface plasmon resonance in the visible or near-IR range comprising (Pd, Pt, Cu, Al). In yet another embodiment, the matrix material contains a silicon compound, such as silica or silane. The matrix material is permeable at least to some degree to the incident light at wavelengths corresponding to the optical signal. For example, when the optical signal comprises a light wavelength range from about 350 nm to about 800 nm, the matrix material is permeable at least to some degree to the incident light at wavelengths from about 350 nm to about 800 nm. In an embodiment, the matrix material is permeable at least to some degree to light at wavelengths over the visible spectrum. Here "visible spectrum" connotes light having wavelengths from about 400 nm to about 750 nm. In another embodiment, the matrix material is permeable at least to some degree to light at wavelengths over the near-infrared spectrum. Here "near-infrared spectrum" connotes light having wavelengths from about 750 nm to 3000 nm. In another embodiment, a permeable matrix is defined as having an extinction coefficient of less than $10^{-5}$ cm$^{-1}$ over the wavelength range of interrogation. In another embodiment, a permeable matrix is defined as having an extinction coefficient of less than $10^{-3}$ cm$^{-1}$ over the wavelength range of interrogation.

Here, a "change in surface charge density over a pH range from 2.0 to 12.0 of at least 1%" means that an absolute value of $(SD_{max}-SD_{min})/SD$, multiplied by 100 is equal to at least 1, where $SD_{max}$ is the maximum surface charge density of the matrix material over a pH range from 2.0 to 12.0 in the aqueous solution and where $SD_{min}$ is the minimum surface charge density of the matrix material over a pH range from 2.0 to 12.0 in the aqueous solution, and $SD_n$ is either the absolute value of $SD_{max}$ or the absolute value of $SD_{min}$, whichever is greater. Similarly, a "volumetric change over a pH range from 2.0 to 12.0 of less than or equal to 0.1%" means that an absolute value of $(V_{max}-V_{min})/V_{max}$ multiplied by 100 is less than or equal to 0.1, where $V_{max}$ is the maximum specific volume of the matrix material over a pH range from 2.0 to 12.0 in the aqueous solution and where $V_{min}$ is the minimum specific volume of the matrix material over a pH range from 2.0 to 12.0 in the aqueous solution.

Within the pH sensing material, the optically active nanoparticles are dispersed in the matrix material. In an embodiment, an average spacing between individual nanoparticles in the plurality is at least five times greater than the average nanoparticle diameter, where average spacing indicates the average displacement between a nanoparticle and a nearest nanoparticle neighbor. The displacement between the given nanoparticle and the nearest nanoparticle neighbor may be determined using techniques such as scanning electron microscopy, atomic force microscopy, and transmission electron microscopy, and the average spacing may be determined as the average value over some statistically significant population of optically active nanoparticles, for example at least 100 optically active nanoparticles. For a given nanoparticle, the nearest nanoparticle neighbor may be determined through a variety of statistical methods known in the art, such as fixed radius analysis, minimal spanning trees, Voronoi polygons, k-nearest neighbor algorithms, and other established nearest neighbor methodologies. See e.g., Dussert et al., "Minimal spanning tree: A new approach for studying order and disorder," *Phys. Rev. B*, 34 (5) (1986), and see Aurenhammer, "Voronoi Diagrams—A Survey of a Fundamental Geometric Data Structure," *ACM Comput. Surv.*, 23(3) (1991), and see Cover et al., "Nearest Neighbor Pattern Classification," *IEEE T. Inform. Theory* 13(1) (1967), among others. In another embodiment, the particles are essentially immobilized by the presence of the matrix such that their spacing does not change appreciably over the range of solution pH values for which an optical sensing response is monitored. In such an embodiment, the average spacing between particles changes by less than 5%, more preferably less than 1%, and most preferably less than 0.1%.

Figure 7:
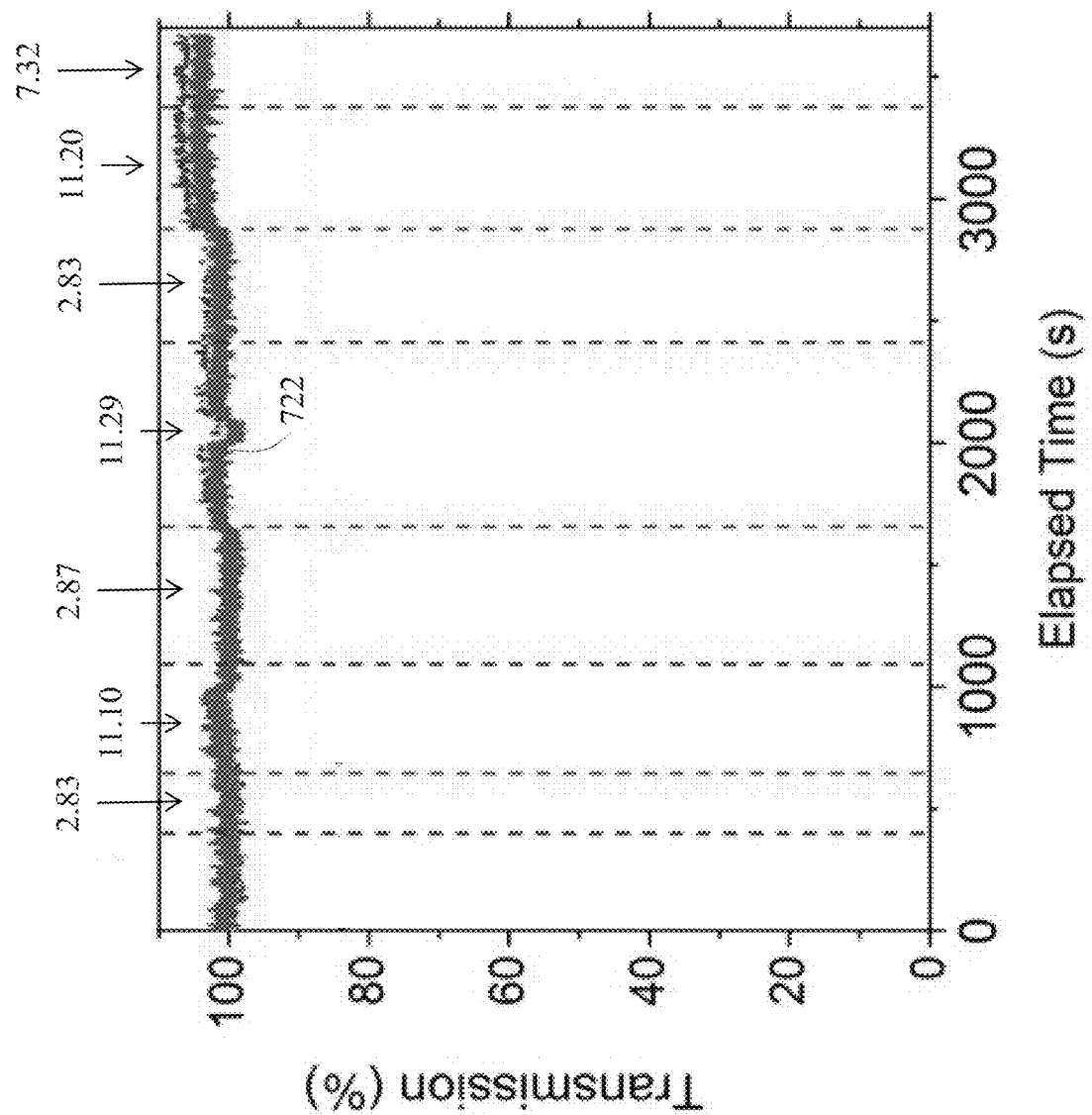
FIG. 7 illustrates a composite optical signal for a silica coated optical fiber generated under a specific fabrication procedure.
Figure 8:
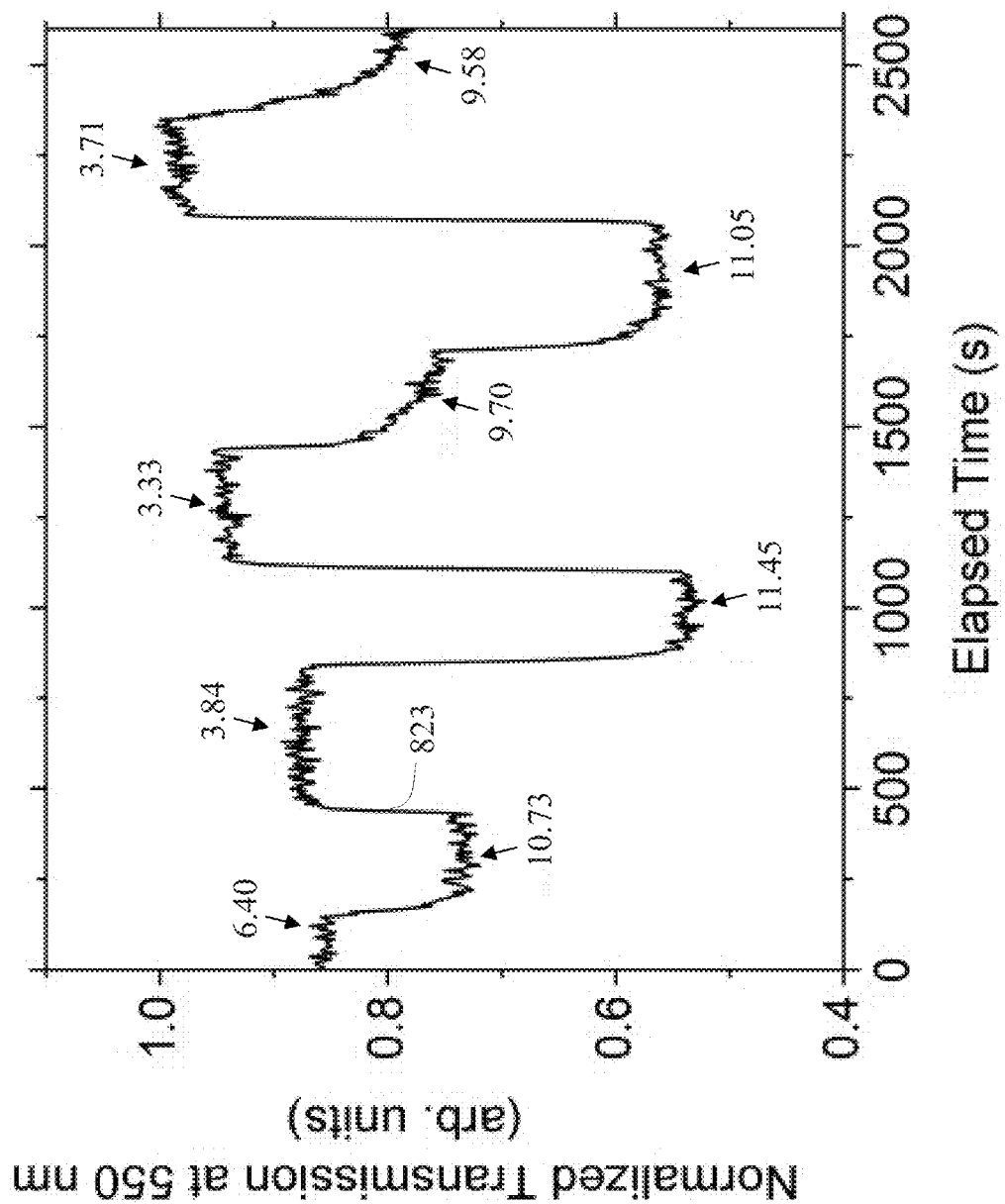
FIG. 8 illustrates the optical signal of an embodiment comprising Au/silica generated under the specific fabrication procedure.

The strong optical response of the pH sensing material disclosed is strongly associated with the optically active materials embedded in the matrix material. See Wang et al., "Novel Silica Surface Charge Density Mediated Control of the Optical Properties of Embedded Optically Active Materials and Its Application for Fiber Optic pH Sensing at Elevated Temperatures," *Nanoscale* (2015), DOI: 10.1039/C4NR06232A. This is generally illustrated with reference to FIGS. 7 and 8. FIG. 7 illustrates the response of an optical fiber coated with a silica matrix material and with the absence of optically active nanoparticles, where the silica matrix material was generated by coating the fiber with pure tetraethoxysilane (TEOS) followed by calcination at 200° C. The silica coated optical fiber was placed in contact with an aqueous solution while pH was varied over the indicated time intervals. At FIG. 7, the pH of the aqueous solution over the respective time intervals are generally indicated by the pH values 2.83, 11.10, 2.87, 11.29, 2.83, 11.20, and 7.32, and signal 722 is a composite representing optical signals generated at wavelengths of 450, 500, 525, 550, 570, 600, 620, 650, 700 and 800 nm. FIG. 7 indicates a generally muted response to pH at all wavelengths monitored for the silica coated optical fiber which is not suitable for optical pH sensing and monitoring. In contrast, FIG. 8 illustrates the response of an optical fiber coated with an embodiment of the pH sensing material disclosed. The pH sensing material of FIG. 8 comprises optically active nanoparticles of Au and a matrix material comprising silica, and was generated by coating the fiber with a mixture of $HAuCl_4$, 1.0 ml deionized water, 4.5 ml ethanol, and 4.5 ml TEOS followed by calcination at 200° C. FIG. 8 illustrates the optical signal 823 at a wavelength of 550 nm for the particular Au/silica embodiment, where the pH of the contacting aqueous solution are generally indicated by the pH values 6.40, 10.73, 3.84, 11.45, 3.33, 9.70, 11.05, 3.71, and 9.58. As indicated, and in contrast to FIG. 7 generated by a matrix material in the absence of optically active nanoparticles, optical signal 823 shows a significant variation in transmission versus pH. These results indicate that the strong optical response of the pH sensing material disclosed is at least generally associated with the optically active materials embedded in the matrix material.

Figure 9:
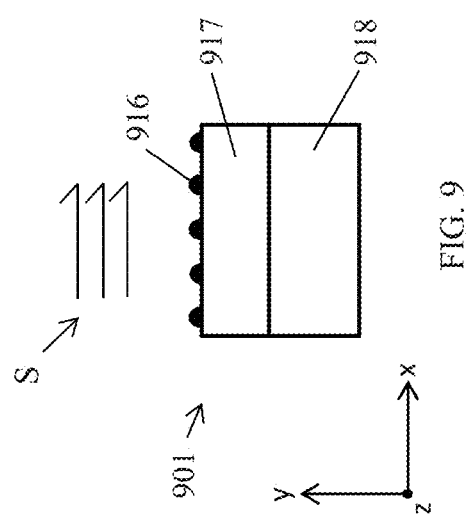
FIG. 9 illustrates a first embodiment of the pH sensing material.
Figure 10:
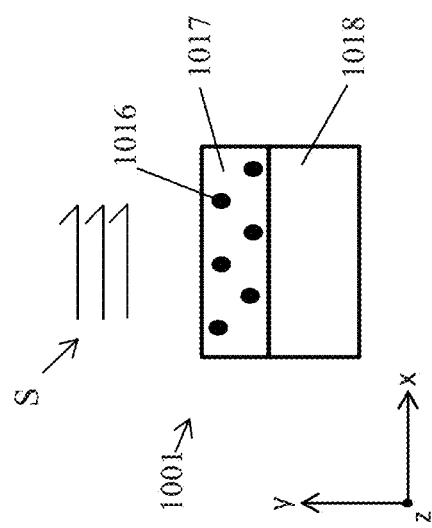
FIG. 10 illustrates a second embodiment of the pH sensing material.
Figure 11:
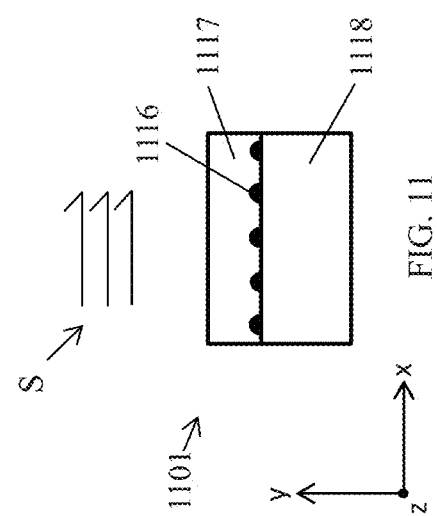
FIG. 11 illustrates a third embodiment of the pH sensing material.

The optically active nanoparticles may be dispersed relatively uniformly or non-uniformly with respect to the matrix material. For example, FIG. 9 illustrates pH sensing material 901 in contact with aqueous solution S, where pH sensing material 901 is comprised of a plurality of optically active nanoparticles such as optically active nanoparticle 916 and matrix material 917, and where pH sensing material 901 is further in contact with a substrate 918. At FIG. 9, the relative concentration of optically active nanoparticles decreases or disappears within matrix material 918 as displacement occurs in a negative direction of the y-axis illustrated. Similarly, FIG. 10 illustrates pH sensing material 1001 in contact with aqueous solution S, where pH sensing material 1001 is comprised of a plurality of optically active nanoparticles such as 1016 and matrix material 1017, and in contact with a substrate 1018. In contrast to FIG. 9, at FIG. 10 the plurality of optically active nanoparticles are distributed relatively homogenously through matrix material 1017, such that the relative concentration of optically active nanoparticles is substantially similar within matrix material 1017 as displacement occurs in a negative direction of the y-axis illustrated. Additionally, FIG. 11 illustrates pH sensing material 1101 in contact with aqueous solution S, where pH sensing material 1101 is comprised of a plurality of optically active nanoparticles such as 1116 and matrix material 1117, and in contact with a substrate 1118, and where the relative concentration of optically active nanoparticles increases within matrix material 1117 as displacement occurs in a negative direction of the y-axis illustrated. However, arrangements such as those in FIGS. 7, 8, and 9 are exemplary only, and the relative concentrations of optically active nanoparticles in varying regions of the inert matrix are not limiting within this disclosure.

As discussed, the optical signal as disclosed here is generally not constrained to a specific wavelength or band of wavelengths, and may reflect behavior at one specific wavelength or a monitored band of wavelengths. In some embodiments, the optical signal may exhibit a maxima or minima peak within a band of wavelengths, and it may be advantageous to evaluate an optical signal at or around the wavelength where the maxima or minima substantially occurs. For example the relative minima at $\lambda_P$ between wavelengths $\lambda_L$ and $\lambda_H$ at FIG. 6. However, the exhibition of a maxima or minima peak within a monitored band of wavelengths is not a requirement within this method, and the optical signal is not limited to wavelengths associated with relative maxima or minima. Within this disclosure and as discussed, optical signal may be monitored at any wavelength or over multiple wavelengths in a band of wavelengths.

Additionally, it is understood that when the disclosure describes monitoring an optical signal and thereby evaluating the pH of an aqueous solution, this includes operations where a shift in the optical signal serves as an indication of a shift in the pH of the aqueous solution. As an example using the results of FIG. 5 for the pH sensing material of Pd/silica, the pH sensing material generates the first optical signal 513 displaying a transmission $T_1$ at a pH of about 10.88 and the second optical signal 514 displaying a transmission $T_2$ at a pH of about 9.51. Here, evaluating the pH of the aqueous solution may comprise treating the transmission $T_1$ as a measurand and assigning a specific value of pH to the measurand such as 10.88, or may comprise monitoring the optical signal at one or more wavelengths such as 800 nm, observing a shift in the optical signal such as from $T_1$ to $T_2$, and treating the observed shift as indicative of a change in pH. Here, a "shift in the optical signal" means a variation between an initial optical signal and a subsequent optical signal at one or more wavelengths, where the initial optical signal is generated at a first time and the subsequent optical signal is generated at a second time, and where both the initial optical signal and the subsequent optical signal are generated by illuminating the pH sensing material with the light source emitting the incident light, collecting the exiting light, and comparing the incident light and the exiting light using optical spectroscopy. The shift in the optical signal may be recognized by detecting a variation between optical signals at any monitored wavelength or by variations at multiple wavelengths over a band of wavelengths. For example, the variation may be detected by monitoring a transmittance at a specific wavelength, the specific wavelength of an optical signal edge within a specified wavelength range, the wavelength of an optical signal local maxima, a variation in the optical signal breadth, a variation in the optical signal amplitude, a variation in the optical signal full width at half maximum (FWHM), or any other techniques which may serve to indicate a variation between the initial optical signal and a subsequent optical signal. In an embodiment, the shift in the optical signal means a variation of at least 0.1% between an initial time-averaged optical signal and a subsequent time-averaged optical signal in transmittance, absorptance, or reflectance at a specific wavelength.

Figure 12:
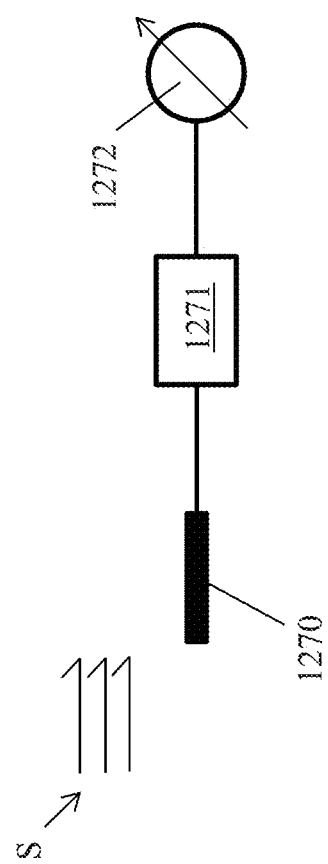
FIG. 12 illustrates an instrument using an embodiment of the pH sensing material.

In a particular embodiment, the pH sensing material is employed in an instrument such as that illustrated at FIG. 12. In this embodiment, the pH sensing material of this disclosure comprises a sensing head 1270 in contact with an aqueous solution S. An interrogator 1271 illuminates the pH sensing material comprising sensing head 1270 with incident light and gathers exiting light. Interrogator 1271 compares the incident light and the exiting light and generates a measurand, where the measurand is proportional to the optical signal as defined herein. Such interrogators for use in optical systems are known in the art. See e.g., Lee et al., "Review of the present status of optical fiber sensors," *Optical Fiber Technology* 9 (2003), and associated references. Interrogator 1271 is in data communication with meter 1272 which provides an indication of the magnitude of the measurand generated and communicated by interrogator 1271. In this embodiment, the steps of illuminating the pH sensing material, collecting exiting light, and monitoring an optical signal based on a comparison of the incident light and the exiting light is conducted by interrogator 1271, and monitoring the optical signal is conducted through observation of meter 1272. An indication of the pH of aqueous solution S is provided by comparison of the observed meter reading and a reference meter reading, where the reference meter reading results from a reference measurand generated under reference conditions, such as when aqueous solution S has a neutral pH or some other condition.

Figure 14:
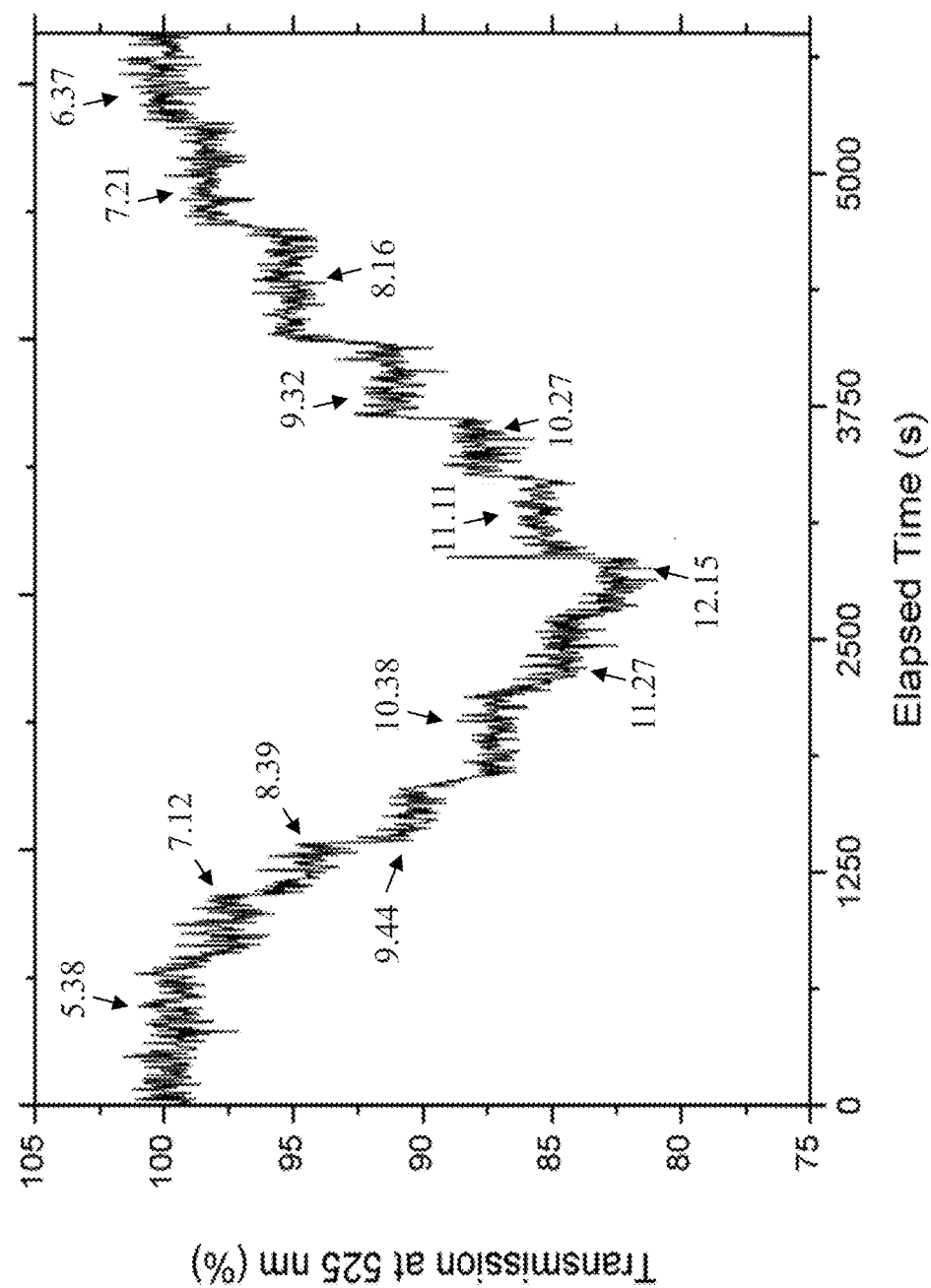
FIG. 14 illustrates an embodiment of a calcined pH sensing material.

In an additional embodiment, the pH sensing material comprises a calcined pH sensing material. Here, "calcined pH sensing material" means a pH sensing material comprising a matrix material and a plurality of optically active nanoparticles, where the pH sensing material is calcined at a given temperature for at least one hour. In an embodiment, the given temperature is at least 150° C., and in a further embodiment, at least 400° C. In general, the optically active nanoparticles utilized are highly stable at elevated temperatures, and the matrix material is anticipated to be stable at temperatures of at least the calcination temperature. Utilizing calcined pH sensing material as the pH sensing material can generally enhance stability of the pH sensing material at higher temperatures. As an example. FIG. 14 illustrates the relative transmission at 525 nm for a coated optical fiber using a calcined pH sensing material of Au/silica calcined at 600° C., where the relative transmission is shown as a function of experimental time and at a temperature of about 600° C., with results indicated by the pH values present and generally indicated by the pH values 5.38, 7.12, 8.39, 9.44, 10.38, 11.27, 12.15, 11.11, 10.27, 9.32, 8.16, 7.21, and 6.37. In a particular embodiment, the pH sensing material disclosed evaluates the pH of an aqueous solution having a temperature of at least 150° C., and in another embodiment the aqueous solution has a temperature of at least 400° C.

Figure 13:
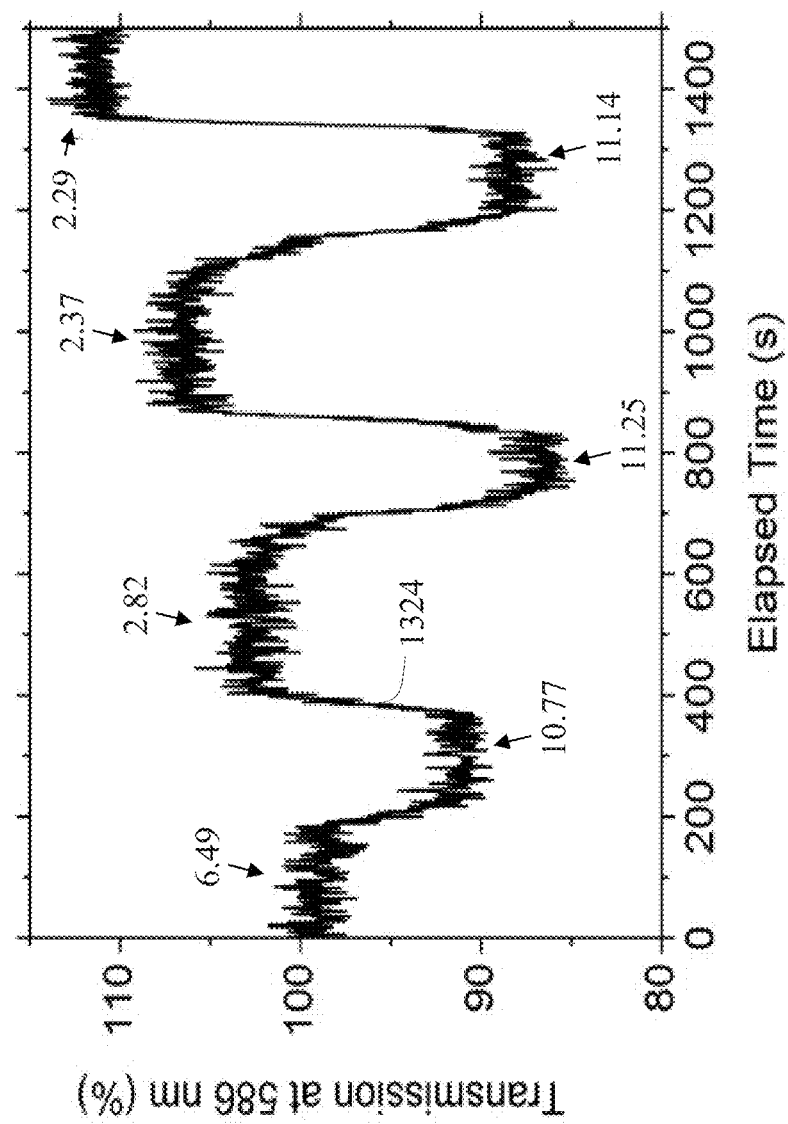
FIG. 13 illustrates the optical signal of an embodiment comprising Rhodamine-B/silica at a wavelength of 586 nm.

Within the pH sensing material disclosed here and without being bound by theory, an essential role may be played by the silica-based matrix, particularly in light of observations that replacement of plasmonic Au nanoparticles with Pd or the organic dye rhodamine B exhibits a qualitatively similar optical response trend with pH and broadband responses consistent with "amplification" of absorption by Au and Pd nanoparticles. For example, FIG. 13 illustrates the relative transmission at 586 nm for a rhodamine B/TEOS coated optical fiber as a function of experimental time at room temperature, with results indicated by the pH values present and generally indicated by the pH values 6.49, 10.77, 2.82, 11.25, 2.37, 11.14, and 2.29. Comparison of the pH dependent optical response of different fibers calcined at different temperatures (200 and 600° C.) and with different materials (Au, Pd and rhodamine B) also reveals that the optical response shows a remarkable similarity to the calculated pH dependent surface charge density of silica based on the 1-pK basic Stern model, providing further evidence for the importance of the matrix, in particular, the surface charging of silica, in the measured response. However, to achieve a measurable optical pH-dependent signal associated with this effect and to retain the response under high temperature operational conditions, the addition of optically active nanoparticles is generally an essential aspect of this disclosure. See e.g. Wang et al., "Novel Silica Surface Charge Density Mediated Control of the Optical Properties of Embedded Optically Active Materials and Its Application for Fiber Optic pH Sensing at Elevated Temperatures," *Nanoscale* (2015), DOI: 10.1039/C4NR06232A.

Thus, provided here is a method for evaluating the pH of an aqueous solution using a pH sensing material which generates an optical signal reflecting the pH. The pH sensing material is comprised of a plurality of optically active nanoparticles dispersed in a matrix material. The optically active nanoparticles have an electronic conductivity greater than about $10^{-1}$ S/cm, and generally have an average nanoparticle diameter of less than about 500 nanometers. The matrix material is a material which experiences a change in surface charge density over a pH range from 2.0 to 12.0 of at least 1%. The method generally comprises contacting the pH sensing material and the aqueous solution, illuminating the pH sensitive material with a light source, and generating an optical signal by comparing incident light and exiting light. The optical signal of the pH sensitive material varies in response to the pH of the aqueous solution, providing a means by which the pH and any changes in the pH may be analyzed.

It is to be understood that the above-described arrangements are only illustrative of the application of the principles of the present invention and it is not intended to be exhaustive or limit the invention to the precise form disclosed. Numerous modifications and alternative arrangements may be devised by those skilled in the art in light of the above teachings without departing from the spirit and scope of the present invention. It is intended that the scope of the invention be defined by the claims appended hereto.

In addition, the previously described versions of the present invention have many advantages, including but not limited to those described above. However, the invention does not require that all advantages and aspects be incorporated into every embodiment of the present invention.

All publications and patent documents cited in this application are incorporated by reference in their entirety for all purposes to the same extent as if each individual publication or patent document were so individually denoted.

What is claimed is:

1. A method of evaluating a pH of an aqueous solution comprising:
    placing a calcined pH sensing material calcined at a temperature of at least 150° C. in the aqueous solution having a temperature of at least 150° C., where the pH sensing material is comprises of,
    a matrix material, where the matrix material has a volumetric change over a pH range from 2.0 to 12.0 of less than or equal to 1% and,
    a plurality of optically active nanoparticles dispersed in the matrix material, where an individual optically active nanoparticles in the plurality of optically active nanoparticles has an electronic conductivity greater than $10^{-1}$ S/cm, an absorption cross-section of at least $10^{-16}$ cm$^2$ at one or more wavelengths comprising the optical signal, a carrier concentration of at least $10^{17}/$cm$^3$ and a bandgap of at least 2 eV, and where the plurality of optically nanoparticles have an average nanoparticle diameter of less than about 500 nanometers;
    illuminating the pH sensing material with a light source emitting incident light;
    collecting exiting light, where the exiting light is light that originates at the light source and is transmitted, reflected, scattered or a combination thereof by the pH sensing material; and
    monitoring an optical signal based on a comparison of the incident light and the exiting light using optical spectroscopy, thereby evaluating the pH of the aqueous solution.

2. The method of claim 1 where the average nanoparticle diameter is less than about 100 nanometers.

3. The method of claim 2 where the individual optically active nanoparticle comprises a metal.

4. The method of claim 3, where the metal is gold, palladium, silver, platinum, ruthenium, rhodium, osmium, iridium or combinations thereof.

5. The method of claim 4 where the metal is gold, palladium, or combinations thereof.

6. The method of claim 2 where the individual optically active nanoparticle comprises a metal oxide.

7. The method of claim 1 where the matrix material comprises silica.

8. The method of claim 1 where the pH sensing material is a calcined pH sensing material calcined at a temperature of at least 400° C., and the aqueous solution has a temperature of at least 400° C.

9. A method of evaluating the pH of the aqueous solution using the method of claim 1, further comprising:
    emitting incident light using an interrogator in optical communicating with the pH sensing material and illuminating the pH sensing material, and gathering exiting light using the interrogator in optical communication with the pH sensing material, and monitoring the optical signal based on the comparison spectroscopy using the interrogator, thereby illuminating the pH sensing material source emitting incident light, collecting exiting light, and monitoring the optical signal based on the comparison of the incident light and the exiting light using optical spectroscopy;
    generating a measurement using the interrogator based on the optical signal, and communicating the measurement to a meter in data communication with the interrogator; and
    receiving the measurement at the meter and displaying a meter reading on the meter based on the measurement.

10. The method of claim 1 where monitoring the optical signal comprises monitoring a shift in the optical signal.

11. A method of evaluating a pH of an aqueous solution comprising:
    placing a pH sensing material calcined at a temperature of at least 400° C. in the aqueous solution having a temperature of at least 400° C., where the pH sensing material is comprises of,
    a matrix material, where the matrix material has a change in surface charge density over a pH range from 2.0 to 12.0 of at least 1% and, where the matrix material has a volumetric change over a pH range from 2.0 to 12.0 of less than or equal to 1% and,
    a plurality of optically active nanoparticles dispersed in the matrix material, where an individual optically active nanoparticles in the plurality of optically active nanoparticles has an electronic conductivity greater than $10^{-1}$ S/cm, and where the individually optically active nanoparticle comprises a metal, and where the plurality of optically nanoparticles have an average nanoparticle diameter of less than about 500 nanometers;
    illuminating the pH sensing material with a light source emitting incident light;
    collecting exiting light, where the exiting light is light that originates at the light source and is transmitted, reflected, scattered or a combination thereof by the pH sensing material; and
    monitoring an optical signal based on a comparison of the incident light and the exiting light using optical spectroscopy, thereby evaluating the pH of the aqueous solution.

12. The method of claim 11, where the metal is gold, palladium, silver, platinum, ruthenium, rhodium, osmium, iridium or combinations thereof.

13. The method of claim 11 where the metal is gold, palladium, or combinations thereof.

14. The method of claim 13 where the matrix material comprises silica.

* * * * *